US010452561B2

(12) United States Patent
Schneider

(10) Patent No.: US 10,452,561 B2
(45) Date of Patent: Oct. 22, 2019

(54) CENTRAL PROCESSING UNIT ARCHITECTURE AND METHODS FOR HIGH AVAILABILITY SYSTEMS

(71) Applicant: RAYTHEON COMPANY, Waltham, MA (US)

(72) Inventor: Eric R. Schneider, North Andover, MA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 15/670,839

(22) Filed: Aug. 7, 2017

(65) Prior Publication Data
US 2018/0039580 A1 Feb. 8, 2018

Related U.S. Application Data

(60) Provisional application No. 62/372,164, filed on Aug. 8, 2016.

(51) Int. Cl.
*G06F 12/10* (2016.01)
*G06F 9/4401* (2018.01)
(Continued)

(52) U.S. Cl.
CPC ........ *G06F 12/1081* (2013.01); *G06F 9/4403* (2013.01); *G06F 9/4405* (2013.01);
(Continued)

(58) Field of Classification Search
CPC ............. G06F 12/1483; G06F 12/1081; G06F 9/4405; G06F 12/1009; G06F 2212/65
See application file for complete search history.

(56) References Cited

U.S. PATENT DOCUMENTS

| 93,489 A | 8/1869 | Smith |
| 143,696 A | 10/1873 | Hinman |
(Continued)

FOREIGN PATENT DOCUMENTS

| CN | 100480957 C | 4/2009 |
| CN | 101218566 B | 11/2011 |
(Continued)

*Primary Examiner* — Masud K Khan
(74) *Attorney, Agent, or Firm* — Lando & Anastasi, LLP

(57) ABSTRACT

Aspects are directed to a start-up or recovery method and a central processing unit (CPU) architecture. In one example, the CPU architecture includes read-only memory (ROM) storing instructions addressable by a first range of physical memory addresses, random access memory (RAM), a direct memory access (DMA) engine, the DMA engine controllable to transfer the instructions from the ROM to RAM, the instructions addressable by a second range of physical memory addresses at the RAM, a memory management unit configured to translate a range of virtual addresses to the first range while in ROM, and translate the range of virtual memory addresses to the second range while in RAM, and a CPU to execute a DMA interrupt service routine to update the memory management unit to translate the range of virtual addresses to the second range of physical memory addresses while the DMA engine transfers the instructions to RAM.

20 Claims, 6 Drawing Sheets

(51) Int. Cl.
*G06F 12/14* (2006.01)
*G06F 12/1081* (2016.01)
*G06F 12/1009* (2016.01)

(52) U.S. Cl.
CPC ...... *G06F 12/1009* (2013.01); *G06F 12/1483* (2013.01); *G06F 2212/1024* (2013.01); *G06F 2212/65* (2013.01); *G06F 2212/657* (2013.01)

(56) References Cited

U.S. PATENT DOCUMENTS

| | | | |
|---|---|---|---|
| 4,907,150 A | 3/1990 | Arroyo et al. | |
| 4,979,143 A | 12/1990 | Takano et al. | |
| 5,175,847 A | 12/1992 | Mellott | |
| 5,276,890 A | 1/1994 | Arai | |
| 5,339,426 A | 8/1994 | Aoshima | |
| 5,390,324 A | 2/1995 | Burckhartt et al. | |
| 5,430,867 A | 7/1995 | Gunji | |
| 5,438,549 A | 8/1995 | Levy | |
| 5,471,624 A | 11/1995 | Enoki et al. | |
| 5,497,494 A | 3/1996 | Combs et al. | |
| 5,513,359 A | 4/1996 | Clark et al. | |
| 5,557,777 A | 9/1996 | Culbert | |
| 5,586,334 A | 12/1996 | Miyazaki et al. | |
| 5,590,340 A | 12/1996 | Morita et al. | |
| 5,684,998 A | 11/1997 | Enoki et al. | |
| 5,765,004 A | 6/1998 | Foster et al. | |
| 5,802,544 A | 9/1998 | Combs et al. | |
| 5,812,859 A | 9/1998 | Kamimaki et al. | |
| 5,845,134 A | 12/1998 | Arai | |
| 5,903,766 A | 5/1999 | Walker et al. | |
| 6,021,500 A | 2/2000 | Wang et al. | |
| 6,052,793 A | 4/2000 | Mermelstein | |
| 6,070,012 A | 5/2000 | Eitner et al. | |
| 6,098,158 A | 8/2000 | Lay et al. | |
| 6,223,293 B1 | 4/2001 | Foster et al. | |
| 6,230,274 B1 | 5/2001 | Stevens et al. | |
| 6,301,673 B1 | 10/2001 | Foster et al. | |
| 6,377,500 B1 | 4/2002 | Fujimoto et al. | |
| 6,378,068 B1 | 4/2002 | Foster et al. | |
| 6,434,696 B1 | 8/2002 | Kang | |
| 6,510,488 B2 | 1/2003 | Lasser | |
| 6,601,130 B1 | 7/2003 | Silvkoff et al. | |
| 6,636,963 B1 | 10/2003 | Stein et al. | |
| 6,691,234 B1 | 2/2004 | Huff | |
| 6,721,885 B1 | 4/2004 | Freeman et al. | |
| 6,792,499 B1 | 9/2004 | Eldredge | |
| 6,807,630 B2 | 10/2004 | Lay et al. | |
| 6,832,311 B2 | 12/2004 | Morisawa | |
| 6,901,505 B2 | 5/2005 | McGrath | |
| 7,017,052 B2 | 3/2006 | Aklilu et al. | |
| 7,100,037 B2 | 8/2006 | Cooper | |
| RE40,092 E | 2/2008 | Kang | |
| 7,386,700 B2 | 6/2008 | Lasser | |
| 7,412,565 B2 | 8/2008 | Wirasinghe et al. | |
| 7,428,473 B2 | 9/2008 | Rodriguez et al. | |
| 7,475,184 B2 | 1/2009 | Lee | |
| 7,478,270 B2 | 1/2009 | Kurita et al. | |
| 7,584,374 B2 | 9/2009 | Gu et al. | |
| 7,624,260 B2 | 11/2009 | Ethier et al. | |
| 7,657,785 B2 | 2/2010 | Haque et al. | |
| 7,664,970 B2 | 2/2010 | Jahagirdar et al. | |
| 7,721,040 B2 | 5/2010 | Lasser et al. | |
| 7,752,481 B2 | 7/2010 | Morisawa | |
| 7,769,945 B2 | 8/2010 | Lasser et al. | |
| 7,793,127 B2 | 9/2010 | Gu et al. | |
| 7,900,074 B2 | 3/2011 | Reece et al. | |
| 7,941,593 B2 | 5/2011 | Lee | |
| 7,953,993 B2 | 5/2011 | Allarey et al. | |
| 7,962,734 B2 | 6/2011 | Allison et al. | |
| 7,971,081 B2 | 6/2011 | Cooper et al. | |
| RE42,727 E | 9/2011 | Kang | |
| 8,103,895 B2 | 1/2012 | Hatano | |
| 8,135,904 B2 | 3/2012 | Lasser et al. | |
| 8,156,320 B2 | 4/2012 | Borras et al. | |
| 8,244,958 B2 | 8/2012 | Lasser | |
| 8,281,169 B2 | 10/2012 | Borras et al. | |
| 8,407,489 B2 | 3/2013 | Rothman et al. | |
| 8,578,144 B2 | 11/2013 | Bower, III et al. | |
| 8,631,259 B2 | 1/2014 | Rothman et al. | |
| 8,707,066 B2 | 4/2014 | Allarey et al. | |
| 8,756,384 B2 | 6/2014 | Kurita et al. | |
| 8,984,316 B2 | 3/2015 | Forristal et al. | |
| 9,032,139 B2 | 5/2015 | Siddiqi et al. | |
| 9,081,575 B2 | 7/2015 | Allarey et al. | |
| 9,141,180 B2 | 9/2015 | Jahagirdar et al. | |
| 9,354,895 B2 | 5/2016 | Lim et al. | |
| 9,367,446 B2 | 6/2016 | Lin et al. | |
| 2001/0039612 A1 | 11/2001 | Lee | |
| 2002/0038328 A1 | 3/2002 | Morisawa | |
| 2003/0188212 A1 | 10/2003 | Kahn et al. | |
| 2003/0191719 A1* | 10/2003 | Ginter | G06F 21/10 |
| | | | 705/54 |
| 2004/0044917 A1 | 3/2004 | Lee et al. | |
| 2004/0093489 A1 | 5/2004 | Hsu | |
| 2004/0103331 A1 | 5/2004 | Cooper | |
| 2004/0143696 A1 | 7/2004 | Hsieh | |
| 2004/0260919 A1 | 12/2004 | Takahashi | |
| 2005/0086551 A1 | 4/2005 | Wirasinghe et al. | |
| 2005/0108589 A1 | 5/2005 | Kadatch et al. | |
| 2006/0026341 A1 | 2/2006 | Lasser | |
| 2006/0253645 A1 | 11/2006 | Lasser | |
| 2006/0277400 A1 | 12/2006 | Veen et al. | |
| 2006/0282654 A1 | 12/2006 | Veen et al. | |
| 2007/0083743 A1 | 4/2007 | Tsang | |
| 2007/0130480 A1 | 6/2007 | Hill et al. | |
| 2007/0157036 A1 | 7/2007 | Jahagirdar et al. | |
| 2007/0157045 A1 | 7/2007 | Gu et al. | |
| 2007/0214349 A1 | 9/2007 | Gu et al. | |
| 2007/0260867 A1* | 11/2007 | Ethier | G06F 9/4418 |
| | | | 713/2 |
| 2007/0300037 A1 | 12/2007 | Rogers et al. | |
| 2008/0072028 A1 | 3/2008 | Allison et al. | |
| 2008/0177935 A1 | 7/2008 | Lasser et al. | |
| 2008/0177936 A1 | 7/2008 | Lasser et al. | |
| 2009/0063810 A1* | 3/2009 | Garcia-Tobin | G06F 12/0638 |
| | | | 711/209 |
| 2009/0100236 A1 | 4/2009 | Puig | |
| 2009/0100307 A1 | 4/2009 | Lee | |
| 2009/0164771 A1 | 6/2009 | Reece et al. | |
| 2009/0271641 A1 | 10/2009 | Rothman et al. | |
| 2009/0327769 A1 | 12/2009 | Hatano | |
| 2010/0058045 A1 | 3/2010 | Borras et al. | |
| 2010/0146311 A1 | 6/2010 | Jahagirdar et al. | |
| 2010/0262799 A1 | 10/2010 | Lasser et al. | |
| 2011/0225410 A1 | 9/2011 | Hung | |
| 2011/0231681 A1 | 9/2011 | Allarey et al. | |
| 2012/0072750 A1 | 3/2012 | Jahagirdar et al. | |
| 2013/0013945 A1 | 1/2013 | Jahagirdar et al. | |
| 2014/0122781 A1* | 5/2014 | Smith | G06F 11/1441 |
| | | | 711/103 |
| 2014/0143477 A1 | 5/2014 | Lin et al. | |
| 2014/0173265 A1 | 6/2014 | Kegel | |
| 2014/0281255 A1* | 9/2014 | Duluk, Jr. | G06F 11/073 |
| | | | 711/133 |
| 2015/0058667 A1 | 2/2015 | Jahagirdar et al. | |
| 2015/0356022 A1* | 12/2015 | Leidel | G06F 12/1009 |
| | | | 711/207 |
| 2017/0329618 A1* | 11/2017 | Tsirkin | G06F 9/4555 |

FOREIGN PATENT DOCUMENTS

| | | |
|---|---|---|
| CN | 102830985 A | 12/2012 |
| CN | 103823769 A | 5/2014 |
| CN | 104794393 A | 7/2015 |
| DE | 112008000180 T5 | 12/2009 |
| EP | 1653331 A2 | 5/2006 |
| EP | 1852780 A1 | 11/2007 |

* cited by examiner

CENTRAL PROCESSING UNIT ARCHITECTURE AND METHODS FOR HIGH AVAILABILITY SYSTEMS

CROSS REFERENCE TO RELATED APPLICATION

This application claims priority under 35 U.S.C. § 119(e) to U.S. Provisional Application Ser. No. 62/372,164, titled "CENTRAL PROCESSING UNIT ARCHITECTURE AND METHODS FOR HIGH AVAILABILITY SYSTEMS," filed on Aug. 8, 2016, which is hereby incorporated herein by reference in its entirety.

BACKGROUND

Many computing systems require a fast response after the application of power (e.g., during start-up). A fast start-up response is especially critical for guidance systems, such as those integrated within aerial, space-based, nautical, or vehicle-based platforms. In these systems, loss of processing power, even for a brief moment, can result in inaccurate navigation, inaccurate target tracking, and dropped communication channels, among various other undesirable effects.

Most computing systems boot from non-volatile memory (e.g., read-only memory (ROM)) and transfer a system image from ROM to volatile memory (e.g., random access memory (RAM)). Once the transfer is complete, the image is executed from the RAM. Other computing systems use a ROM resident configuration that maintains software instructions and constant data in or on ROM, and utilize the RAM for variable data storage and stacks. During most start-up procedures, initialization processes typically include central processor unit (CPU) and memory controller register initialization, memory zeroing for non-initialized data, and set-up processes for memory transfer.

Some typical approaches for providing a fast start-up response time include processes for entering/exiting a sleep mode and/or processes for entering/exiting a hibernation mode. Other approaches rely on the use of memory that does not require power to operate, such as Magnetoresistive Random Access Memory (MRAM). Particular examples of these approaches may be found in most consumer computing products, such as desktop and laptop computers. Other computing systems support high availability by utilizing a redundant processing architecture.

SUMMARY OF THE INVENTION

Various aspects and examples described herein provide an improved central processing unit (CPU) architecture for fast start-up and recovery. As further discussed herein, particular examples of the improved CPU architecture include a direct memory access (DMA) engine that is controlled to transfer read-only memory (ROM) resident software instructions and/or data (e.g., a ROM resident system image) from read-only memory (ROM) to random access memory (RAM) following the application of power (e.g., start-up or reset) to the CPU architecture. A CPU memory management unit translates a range of virtual memory addresses to a range of physical memory addresses corresponding to the ROM resident system image. In the described examples, the CPU executes a direct memory access (DMA) interrupt service routine configured to dynamically update the CPU memory management unit to change the range of physical memory addresses references from the ROM to the RAM as the DMA engine transfers the system image to the RAM. Accordingly, a CPU of the CPU architecture may execute those portions of the system image software instructions that have been transferred to the RAM, from the RAM, as those portions are transferred and thus available. The CPU executes from ROM those portions of the software instructions that have not yet been transferred from the ROM until a translatable range of software instructions is available at the RAM. Such examples utilize the increased speed of the RAM, relative to the ROM, to increase the software instruction execution rate of the CPU while still providing the fast start-up and recovery response of a ROM resident system image.

Accordingly, in addition to providing greater system availability for systems that rely on processing power, various examples of the CPU architecture and related methods described herein fundamentally improve the functionality of the CPU itself. That is, various aspects and examples improve the speed and executional efficiency of the CPU while simultaneously improving the response time and boot-up time of the CPU. As further discussed below, the improved speed and executional efficiency of various examples may facilitate improvements to various high availability computing systems, such as embedded control system for autonomous vehicles; inertial measurement, aerospace, and other guidance systems, telecommunication systems, medical equipment, and financial transaction systems. For instance, particular examples may improve navigational accuracy, target tracking, and communication availability, among various other results that may be experienced by a system during a start-up procedure.

According to an aspect, provided is a central processing architecture. In one example, the central processing architecture comprises read-only memory storing a set of software instructions addressable by a first range of physical memory addresses and executable by a central processing unit via one or more access requests, the one or more access requests including a range of virtual memory addresses corresponding to the first range of physical memory addresses, random access memory, a direct memory access engine, the direct memory access engine controllable to transfer the set of software instructions from the read-only memory to the random access memory, the set of software instructions addressable by a second range of physical memory addresses corresponding to the range of virtual memory addresses at the random access memory, a central processing unit memory management unit configured to translate the range of virtual memory addresses to the first range of physical memory addresses while the set of software instructions are in the read-only memory, and translate the range of virtual memory addresses to the second range of physical memory addresses while the set of software instructions are in the random access memory, and a central processing unit configured to execute a direct memory access interrupt service routine to update the central processing unit memory management unit to translate the range of virtual memory addresses to the second range of physical memory addresses while the direct memory access engine transfers the set of software instructions to the random access memory.

According to various examples, the set of software instructions is a read-only memory resident system image. In certain examples, the set of software instructions are stored in at least one page of virtual memory. According to some examples, the central processing unit memory management unit is configured to maintain a local page table including one or more page table entries that translate the range of virtual memory addresses for the at least one page.

In some examples, the central processing unit memory management unit is configured to provide at least a first page table entry of the local page table to the central processing unit to translate the range of virtual memory addresses to the first range of physical memory addresses, and the central processing unit memory management unit is configured to transfer a second page table entry of the local page table to the random access memory, the second table entry being accessible at the random access memory to translate the range virtual memory addresses to the second range of physical memory addresses. In one example, the central processing unit memory management unit is configured to restrict access to the first page table entry while the set of software instructions are in the random access memory.

According to various examples, the set of software instructions are stored in at least one block of virtual memory. In certain examples, the central processing unit memory management unit is configured to maintain a local block table including one or more block table entries that translate the range of virtual memory addresses for the at least one block. According to some examples, the direct memory access engine is further configured to generate a notification once the set of software instructions are in the random access memory.

In various examples, the central processing unit is configured to execute the set of software instructions in response to activation of the central processing unit from an unpowered state, and the central processing unit architecture further comprises a power controller configured to distribute power to at least the central processing unit, the power controller being configured to provide power to activate the central processing unit from the unpowered state. In some examples, the set of software instructions are stored in a plurality of pages or a plurality of blocks of virtual memory, and the direct memory access engine is configured to transfer the set of software instructions from the read-only memory to the random access memory one page of the plurality of pages, or one block of the plurality of blocks, at a time. In one example, in executing the direct memory access interrupt service routine, the direct memory access interrupt service routine is configured to update the central processing unit memory management unit to translate the range of virtual memory addresses to the second range of physical memory addresses as each page of the plurality of pages, or each block of the plurality of blocks, is transferred.

According to various examples, the read-only memory is magnetoresistive random-access memory (MRAM) and the random access memory is static random access memory (SRAM).

According to another aspect, provided is a fast start-up method for a computing system. In one example, the method comprises at read-only memory, providing a set of software instructions addressable by a first range of physical memory addresses, the set of software instructions executable by a central processing unit via one or more access requests, the one or more access requests including a range of virtual memory addresses corresponding to the first range of physical memory addresses, at a central processing unit memory management unit, translating the range of virtual memory addresses to the first range of physical memory addresses while the set of software instructions are in the read-only memory, transferring the set of software instructions from the read-only memory to a random access memory with a direct memory access engine, the set of software instructions addressable by a second range of physical memory addresses corresponding to the range of virtual memory addresses while in the random access memory, via a direct memory access interrupt service routine, updating the central processing unit memory management unit to translate the range of virtual memory addresses to the second range of physical memory addresses while the direct memory access engine transfers the set of software instructions to the random access memory, and at a central processing unit memory management unit, translating the range of virtual memory addresses to the second range of physical memory addresses once the set of software instructions are in the random access memory.

According to various examples, the method further comprises at a memory controller, first accessing the set of software instructions at the read-only memory based on the first range of physical memory addresses, and subsequently accessing the set of software instructions at the random access memory based on the second range of physical memory addresses, once the set of software instructions are transferred to the random access memory. In certain examples, providing the set of software instructions at the read-only memory includes storing the set of software instructions in a memory frame corresponding to at least one page of virtual memory, the method further comprises, at the central processing unit memory management unit, maintaining a local page table including one or more page table entries that translate the range of virtual memory addresses.

In various examples, translating the range of virtual memory addresses to the first range of physical memory addresses includes providing at least a first table entry of the local page table to the central processing unit, and translating the range of virtual memory addresses to the second range of physical memory addresses includes transferring a second table entry of the local page table to the random access memory, the second table entry being accessible at the random access memory to by the memory controller. In some examples, the method further comprises restricting access to the first table entry while the set of software instructions are in the random access memory.

According to various examples, providing the set of software instructions at the read-only memory includes storing the set of software instructions in a memory frame corresponding to at least one block of virtual memory, and the method further comprises, at the central processing unit memory management unit, maintaining a local block table including one or more block table entries that translate the range of virtual memory addresses. In at least one example, providing the set of software instructions includes storing the set of software instructions in a plurality of pages or in a plurality of blocks of virtual memory corresponding to one or more memory frames in the read-only memory, transferring the set of software instructions from the read-only memory to the random access memory includes transferring the set of software instructions one page of the plurality of pages, or one block of the plurality of blocks, at a time, and updating the central processing unit memory management unit includes updating the central processing unit memory management unit to translate the range of virtual memory addresses to the second range of physical memory addresses as each page of the plurality of pages, or each block of the plurality of blocks, is transferred.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
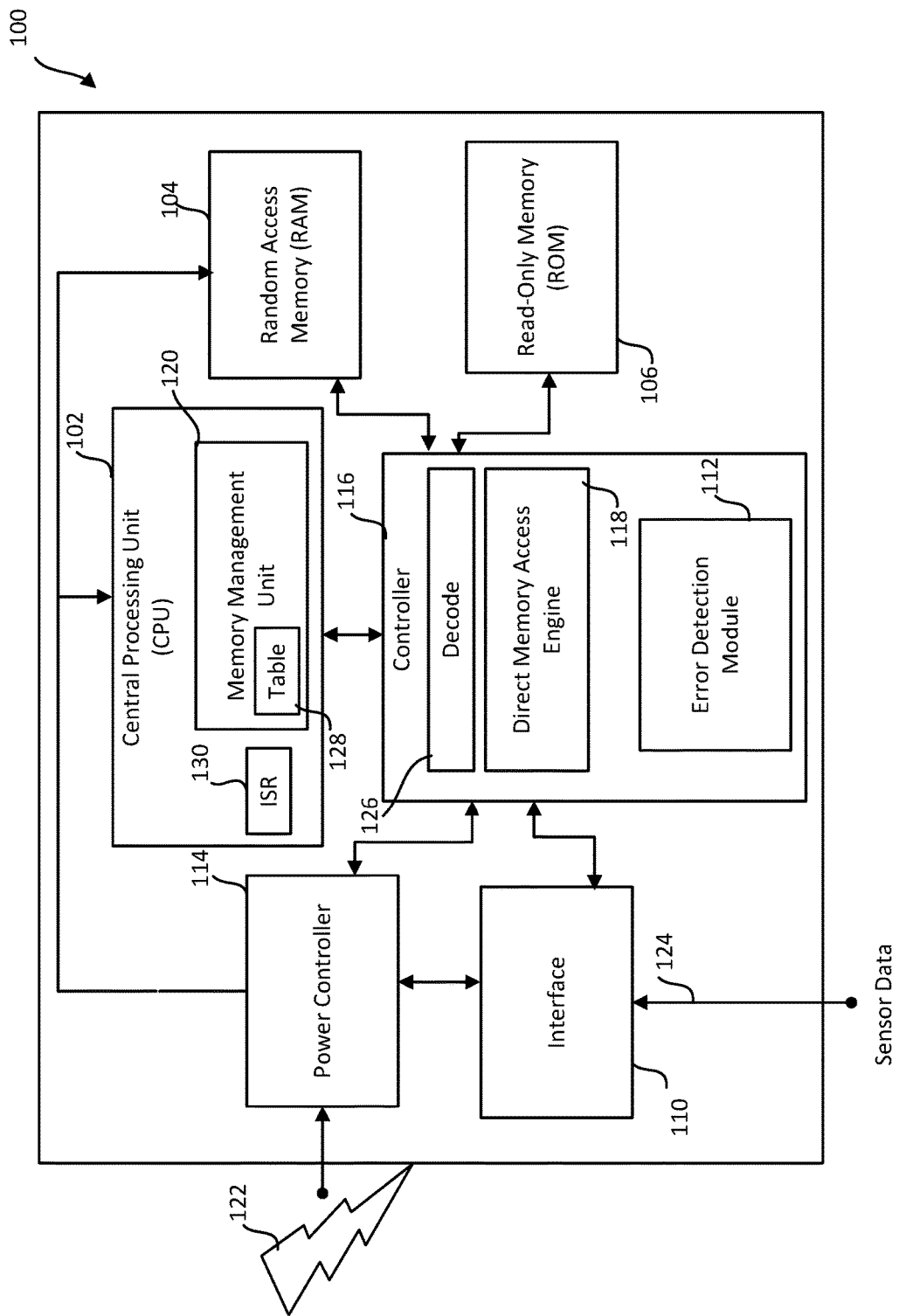
FIG. 1 is a central processing unit architecture according to various examples described herein.

Various aspects and examples described herein are directed to fast start-up and recovery methods, and an improved CPU architecture for fast start-ups and recoveries. In various examples, the CPU architecture may be integrated within a control system that includes a fault or error detection system designed to sense an operational or environmental condition that requires a power down or reset of the control system. In various other examples, the CPU architecture may be integrated within a computing system for an autonomous vehicle, a guidance system, a telecommunication system, medical equipment, a financial transaction system, or an imaging system.

Power may be lost from a system for a variety of reasons. Moreover, responsive to detection of an error or fault, power may be intentionally removed from the components of the control system or the control system may be reset. Once power has been restored, the CPU architecture may execute a fast start-up method. In various examples, the fast start-up method includes generating a memory mirror for a set of software instructions and/or data initially available in read-only memory (ROM) (e.g., a ROM resident system image). The method may include incrementally reading the set of software instructions and/or data from read-only memory (ROM) and writing the set of software instructions and/or data to random access memory (RAM) using direct memory access while a DMA interrupt service routine dynamically updates a location reference (e.g., in a CPU memory management unit or a memory controller) of the set of software instructions and/or data. Accordingly, dynamic updates to the location reference ensure that the set of software instructions and/or data are referenced from RAM rather than ROM immediately following the transfer.

As discussed above, typical approaches for providing a fast power-up response time rely on a suspended operation mode (e.g., a sleep mode or hibernation mode) and/or the use of non-volatile memory in a ROM resident configuration. While these approaches are effective when implemented within consumer computing products, such as desktop and laptop computers, they are less effective when implemented within computing systems that require near-instantaneous response time during start-up or recovery procedures. For instance, delays during reset or start-up procedures of an autonomous vehicle control system could compromise the safety of vehicle passengers.

Sleep mode enables a relatively fast response to data requests by storing instructions and data in volatile memory. However, access to the instructions and data is lost when power is removed from the volatile memory. Hibernate mode addresses issues of power loss by storing instructions and data in non-volatile storage. However, as one skilled in the art will appreciate, non-volatile storage is notably slower than volatile memory. Accordingly, hibernate modes sacrifice response time for stability. Moreover, both sleep and hibernate modes restore the operation of the related computing system rather than resetting operation. Accordingly, these procedures are not an option for computing systems that require a reset to recover from various error or fault conditions. Other approaches relay on redundant processing components. However, these approaches add complexity and cost, and may not address power glitches or other conditions that effect both primary and redundant components.

As such, various aspects and examples of the improved CPU architecture and fast start-up processes described herein offer functionality for computing systems that is not currently provided by commercial computing products. In addition to providing greater system stability for systems that rely on processing power, various examples of the CPU architecture and related processes described herein fundamentally improve the functionality of a CPU itself. That is, various aspects and examples improve the speed and executional efficiency of the CPU while simultaneously improving the response time and boot-up time of the CPU. As further discussed below, the improved speed and executional efficiency may avoid autonomous vehicle accidents, reduce inaccuracies in navigation, enable time critical financial transactions, and support a greater availability of emergency, critical care, and other communications.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated a block diagram of a central processing unit (CPU) architecture 100 according to various examples described herein. While in various examples, the CPU architecture 100 may be incorporated within a guidance system (e.g., an aerial, space-based, nautical, or vehicle-based guidance system), in other examples, the CPU architecture 100 may be integrated within other types of computing systems. For instance, in one particular example the CPU architecture 100 may be integrated within a control system for an autonomous vehicle or a control system for a vehicle with autonomous control functionality. In other examples, the CPU architecture 100 may be implemented within imaging systems, navigation systems, and/or communication systems. In other examples, the CPU architecture may be implemented within commercial or business computing products such as servers, desktop computers, laptop computers, tablet computers, smart phones, personal digital assistants (PDAs), set top boxes, modems, TVs, video players, and/or gaming consoles, to name a few examples. As further discussed below with reference to at least FIGS. 3, 4, and 6 various acts and steps of the fast start-up methods discussed herein may be executed by the CPU architecture 100 illustrated in FIG. 1.

As illustrated in FIG. 1, the CPU architecture 100 includes a central processing unit (CPU) 102, volatile memory (e.g., random access memory (RAM) 104), non-volatile memory (e.g., read-only memory (ROM) 106), a memory controller 116, one or more system interface components 110, a power controller 114, and an error detection module 112. Although described herein as read-only memory, it is appreciated that in certain examples the ROM 106 may include writeable/programmable non-volatile memory, such as MRAM or EEPROM. The memory controller 116 may include one or more software components or one or more hardware components, such as the illustrated direct memory access (DMA) engine 118 and the controller decode module 126. The CPU 102 may also include one or more software components or one or more hardware components, such as the illustrated CPU memory management unit 120. While illustrated in FIG. 1 as being separate from the CPU 102, in various examples the memory controller 116 (or one or more components of the memory controller 116) and/or the power controller 114 may be implemented as an integrated circuit or software module within the CPU 102.

To implement at least some of the aspects, functions, and processes disclosed herein, the CPU 102 is configured to perform a series of software instructions that result in manipulated data. The CPU 102 may be any type of CPU, multi-CPU, or controller. Example CPUs may include an Intel® Xeon, Itanium®, Pentium®, Celeron®, or Core® CPU, offered by Intel Corporation of Santa Clara, Calif. Other examples may include an AMD Athlon®, Sempron®, FX®, or Opteron® CPU, offered by Advanced Micro Devices, Inc. of Sunnyvale, Calif.; an Apple® A4 or A5 CPU, offered by Apple Incorporated of Cupertino, Calif.; an IBM Power CPU or an IBM mainframe chip, offered by IBM Corporation of Armonk, N.Y.; or a quantum computer, to name a few examples. In various other examples, the CPU may be incorporated within an integrated circuit such as an application specific integrated circuit (ASIC) or a field-programmable gate array (FPGA). In other examples, the CPU 102 may include CPU-like circuits such as a digital signal processor (DSP), an encryption engine, a protocol processing engine, or other devices that execute instructions from main memory. The CPU 102 is connected to other system components, such as the RAM 104, ROM 106, the one or more interface components 110, the memory controller 116, the error detection module 112, and the power controller 114 by one or more interconnection elements.

The ROM 106 includes a computer readable non-volatile, or non-transitory, data storage medium in which at least one set of executable software instructions and/or readable/writeable data is stored. For instance, in one example the ROM stores a ROM resident set of software instructions, ROM resident data, or a combination thereof. Specifically, the ROM may store a ROM resident system image. As described herein, a system image may include a copy of a state of a computing system. In certain other examples, the ROM may store a process image. While described herein as a set of software instructions, it is appreciated that in various other examples the set of software instructions may instead be data and/or a combination of software instructions and data.

The set of software instructions is recorded and referenced by a range of physical memory addresses that corresponds to a location of the software instructions within memory (e.g., within the ROM 106 or RAM 104). As further described below with reference to the CPU memory management unit 120, the CPU 102 may address the set of software instructions by way of a range of virtual memory addresses that correspond to a range of physical memory addresses. In particular, the CPU may provide one or more access requests referring to the range of virtual memory addresses, and the CPU memory management unit 120 may translate that range of virtual memory addresses to the corresponding range of physical memory addresses. The physical memory addresses may be used by the memory controller 116 to access the set of software instructions. For instance, the memory controller may perform one or more selection actions on a CPU bus to select the set of software instructions from the ROM 106 or RAM 104 based on the physical memory addresses. In one example, the memory controller includes a decode module 126 configured to decode the access request and access the ROM 106 or RAM 104. In various examples, the memory controller 116 is an integrated digital circuit. While shown as being separate from the CPU 102, in various other examples the memory controller 116 may be integrated within the CPU 102.

The set of software instructions may define a program that is executed by the CPU 102 after the CPU 102 is activated from an unpowered state. In one example the set of software instructions may be a component of a system image. In addition to the set of software instructions, the ROM 106 also may include data that is recorded, on or in, the medium, and that is processed by the CPU 102 during execution of the set of software instructions. The ROM 106 may store the set of software instructions and/or data in one or more memory units that correspond to one or more pages or one or more blocks of virtual memory. As discussed herein, a page refers to a unit of virtual memory having a fixed frame size (e.g., four kilobytes) and a block refers to a unit of virtual memory having a variable frame size. Mapping between pages or blocks of the virtual memory to physical memory frames is further described below with reference to the CPU memory management unit 120 and the memory controller 116.

The set of software instructions may be persistently stored as encoded signals, and the instructions may cause the CPU 102 to perform one or more functions during the start-up of the CPU. The ROM 106 may, for example, be MRAM, Ferroelectric RAM (F-RAM), Phase-change RAM (PRAM), Flash memory, EEPROM, an optical disk, or a magnetic disk, among various other types of non-volatile memory. Notably, the ROM 106 stores the set of software instructions when the CPU 102 (and/or associated computing system) is in the unpowered state. Once the CPU 102 is activated from the unpowered state, and initialization and boot processes are performed (discussed below), the DMA engine 118 causes the set of software instructions (and/or data) to be read from the ROM 106 and written on or in the RAM 104. The RAM 104 allows faster access to the set of software instructions and/or associated when compared with the ROM 106. The CPU 102 may manipulate the associated data within the RAM 104. The ROM 106 may include writeable non-volatile memory.

The RAM 104 is configured to store the set of software instructions coded to be executable by the CPU 102 during operation of the CPU architecture 100. In particular, the RAM 104 is configured to store the set of software instructions (and associated data) when the CPU 102 is in a powered state. Thus, the RAM 104 may be a relatively high performance, volatile memory such as a dynamic random access memory (DRAM), static random access memory (SRAM), or integrated random access memory (IRAM). Similar to the ROM 106, the RAM is accessible in one or more memory frames that correspond to one or more pages or one or more blocks of virtual memory.

As discussed above, in various examples the DMA engine 118 is coupled to the ROM 106 and the RAM 104 and controllable to read the set of software instructions from the ROM 106 and write the set of software instructions to the RAM 104. In certain examples, the DMA engine 118 may be directed by the CPU 102 to transfer the set of software instructions between the ROM 106 and RAM 104 during the execution of the set of software instructions by the CPU 102. For example, the DMA engine 118 may be a DMA controller that incrementally copies the set of software instructions and data from the ROM 106 to the RAM 104 via one or more DMA channels. However, in other examples the DMA engine 118 may be implemented as a software module at the CPU 102. In various examples, the CPU 102 executes a direct memory access (DMA) interrupt service routine 130 that specifies the source, the destination, the unit size, and the direction of transfer. While illustrated within the CPU 102, it is appreciated that in various examples, the direct memory access (DMA) interrupt service routine 130 may be a hardware (FPGA or ASIC) component, and therefore illustrated in various other locations within the CPU 102 architecture of FIG. 1. For instance, in other examples, the DMA interrupt service routine 130 may be illustrated within the memory controller 130. Implementation of the DMA interrupt service routine 130 in a hardware component may be developed in a language such as Verilog, VHDL, or any other language utilized for FPGA or ASIC development.

In an example where the set of software instructions (and/or data) is stored as pages of virtual memory, the DMA engine 118 may transfer the set of software instructions one page at a time. Similarly, where the set of software instructions and/or data are stored as blocks of virtual memory, the DMA engine 118 may transfer the set of software instructions one block at a time. In various other examples, the transferred set of software instructions and/or data may be transferred in one or more units of a configurable (e.g., variable or selectable) size. While in one example, the DMA engine 118 may directly transfer the set of instructions between the ROM 106 and RAM 104, in various other examples, the direct memory access controller may issue instructions to a peripheral device to transfer the set of instructions.

According to various examples, the DMA engine 118 supports requests to transfer large regions of the ROM 106 to the RAM, but performs this transfer as a plurality of small transfers. Transfers performed over the course of many small units permit address update translations to be performed with a finer level of granularity. For instance, a two megabyte transfer may be portioned between multiple four kilobyte portions that each correspond to a four kilobyte page size.

Figure 5A:
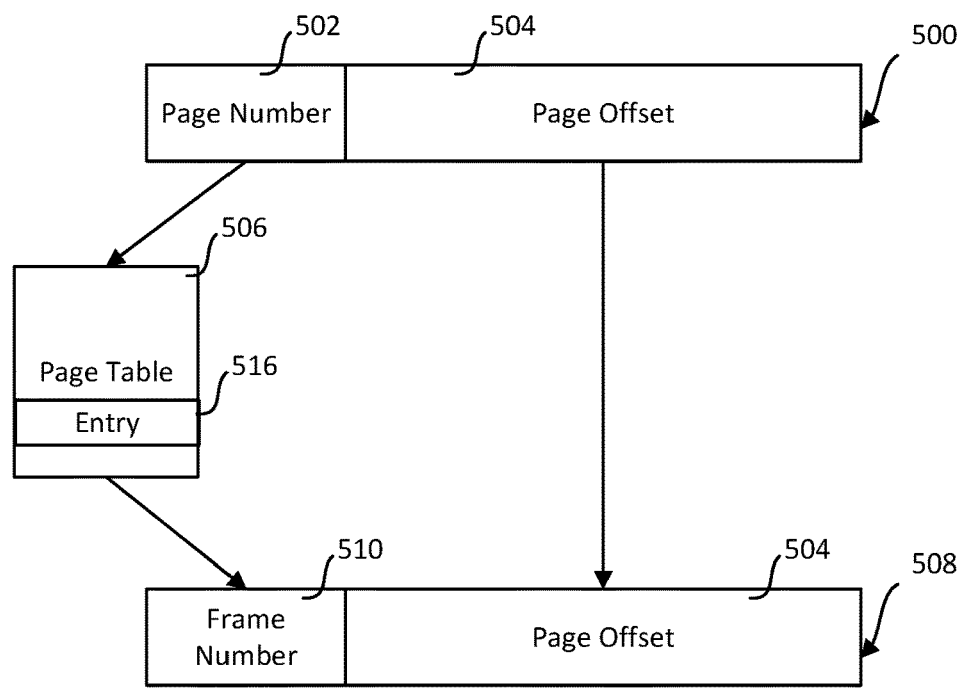
FIG. 5A is an illustration of a translation between a virtual memory address and a physical memory address, according to various examples described herein.

The CPU memory management unit 120 is coupled to the CPU 102 and configured to translate the range of virtual memory addresses to the range of physical memory addresses that correspond to the set of software instructions (and/or data). As discussed, in various examples the set of software instructions may be stored corresponding to one or more pages of virtual memory that correspond to one or more contiguous or non-contiguous memory frames (e.g., one or more memory frames of the ROM 106 or RAM 104). In such an example, a virtual memory address 500 may include a portion corresponding to a page number 502 and a portion corresponding to a page offset 504. FIG. 5A illustrates one example of a virtual memory address 500 translated to a physical memory address 508 using a page table entry 516. The CPU architecture 100 may maintain a page table 506 that includes a plurality of page entries 516. Each page table entry 516 is indexed by page number and contains the frame number of a memory frame corresponding to that page number. For instance, in FIG. 5 the page number 502 corresponds to frame number 510. In certain examples, the page table entry 516 may further include the state of the page in memory (e.g., valid/invalid, access permission, and etc.). As shown, the physical memory address 508 includes a portion corresponding to the frame number 510 and the page offset 504. The page offset 504 remains unchanged and the virtual memory address 500 and the physical memory address 508 translation. Accordingly, in various examples, page table entries 516 may be provided to translate between a virtual memory address and a physical memory address.

Figure 5B:
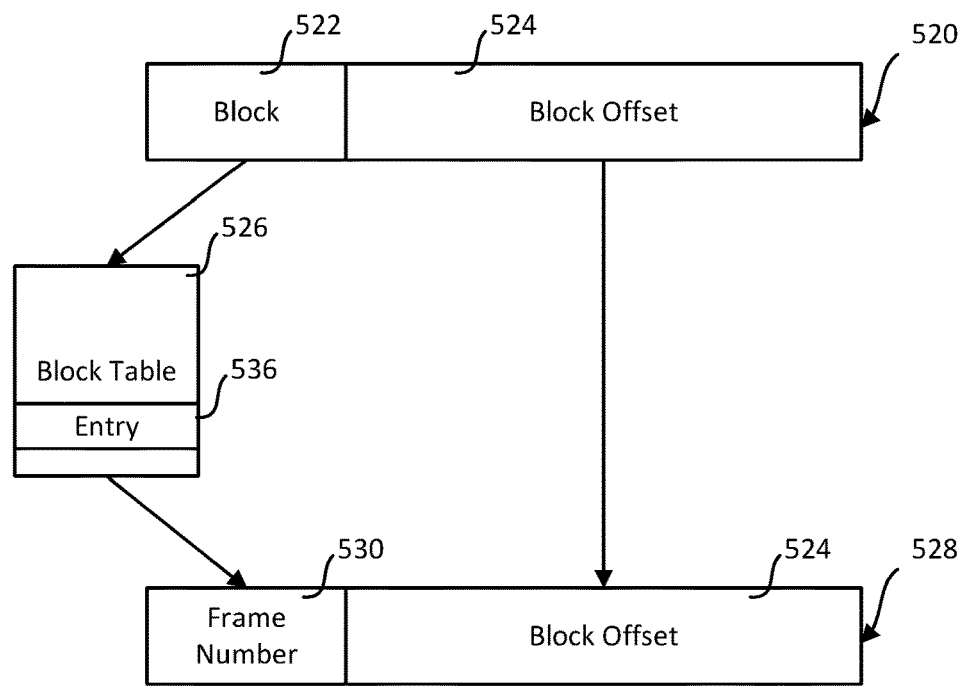
FIG. 5B is a another illustration of a translation between a virtual memory address and a physical memory address, according to various examples described herein.

In certain other examples, the set of software instructions (and/or data) may be stored as one or more blocks of virtual memory that correspond to one or more contiguous or non-contiguous memory frames (e.g., one or more memory frames of the ROM 106 or RAM 104). Unlike pages, which typically have a fixed size, in various examples blocks have a variable size. In such an example, a virtual memory address 520 may include a portion corresponding to a block number 522 and a portion corresponding to a block offset 524. FIG. 5B illustrates one example of a virtual memory address translated 520 to a physical memory address 528 using a block table entry 536. The CPU architecture 100 may maintain a block table 526 that includes a plurality of block table entries 536. As shown, the physical memory address 528 includes a portion corresponding to the frame number 530 and the block offset 524. Accordingly, in various examples, block table entries 536 may be provided to translate between a virtual memory address and a physical memory address.

Referring to FIG. 1, while the set of software instructions are in the ROM 106, the CPU memory management unit 120 translates the range of virtual memory addresses to a range of ROM physical memory addresses (e.g., a first range of physical memory addresses). When the set of software instructions are in the RAM 104, the CPU memory management unit translates the range of virtual addresses to a range of RAM physical memory addresses (e.g., a second range of physical memory addresses). While the set of software instructions are being transferred from the ROM 106 to the RAM 104, the CPU memory management unit 120 is configured to translate the range of virtual memory addresses to the first range of physical memory addresses for those portions of the instructions that are in the ROM 106, and translate the virtual memory addresses to the second range of physical memory addresses of the RAM 106 for those portions of the instructions that are in the RAM 106.

As discussed above, in certain examples the CPU architecture 100 maintains a page table or a block table that may be referenced to translate between the range of virtual memory addresses and the range of physical memory addresses. While in one example, the page table or the block table may be stored in main memory (e.g., the RAM 104), in various other examples the CPU memory management unit 120 or the memory controller 126 maintains a local page table (e.g., in local cache) to permit fast access to page table entries or block table entries. Moreover the CPU memory management unit 120 or the memory controller 126 may rely on the local page table or local block table to restrict access to the page table or block table in main memory while the set of software instructions are transferred from the ROM 106 to the RAM 104. Once the complete set of software instructions are available in the RAM 104, the corresponding page table entries or block table entries may be accessed in the RAM 104. Local tables (e.g., block or page) are shown as table 128 in FIG. 1.

In various examples, the DMA interrupt service routine 130 may access the CPU memory management unit 120 configuration while the DMA engine 118 is controlled to transfer the set of software instructions from the ROM 106 to the RAM 104. In particular, the DMA interrupt service routine 130 is configured to dynamically update the CPU memory management unit 120 such that the range of virtual memory addresses translate to the range of RAM physical memory addresses once the set of software instructions are available in the RAM 104. For instance, in various examples, the DMA interrupt service routine 130 updates each physical memory address range to point to the RAM 104 as a corresponding portion of the set of software instructions is transferred to the RAM 104.

The DMA engine 118 may be further configured to restrict access to the RAM 104 located units (e.g., pages or blocks) of the set of software instructions until a complete transfer is finished. Similarly, the DMA engine 118 may be configured to restrict access to the ROM 106 resident set of instructions once a complete copy of the set of software instructions is available at the RAM 104. A new page table entry may provide access to the ROM page at a new virtual address while the old virtual address is updated to point to RAM instead of ROM. In various examples, updates may appear as new or updated page table entries within the local page table or the page table in the RAM 104. Similarly, updates may appear as new or updated block table entries within the local block table or the block table in the RAM 104. While described within the context of the CPU memory management unit 120, in certain other examples, the DMA interrupt service routine 130 may access the memory controller 116 configuration while the DMA engine 118 is controlled to transfer the set of software instructions from the ROM 106 to the RAM 104. In particular, the DMA interrupt service routine 130 is configured to dynamically update the memory controller 116 configuration such that the range of virtual memory addresses translate to the range of RAM physical memory addresses once the set of software instructions are available in the RAM 104.

Figure 2:
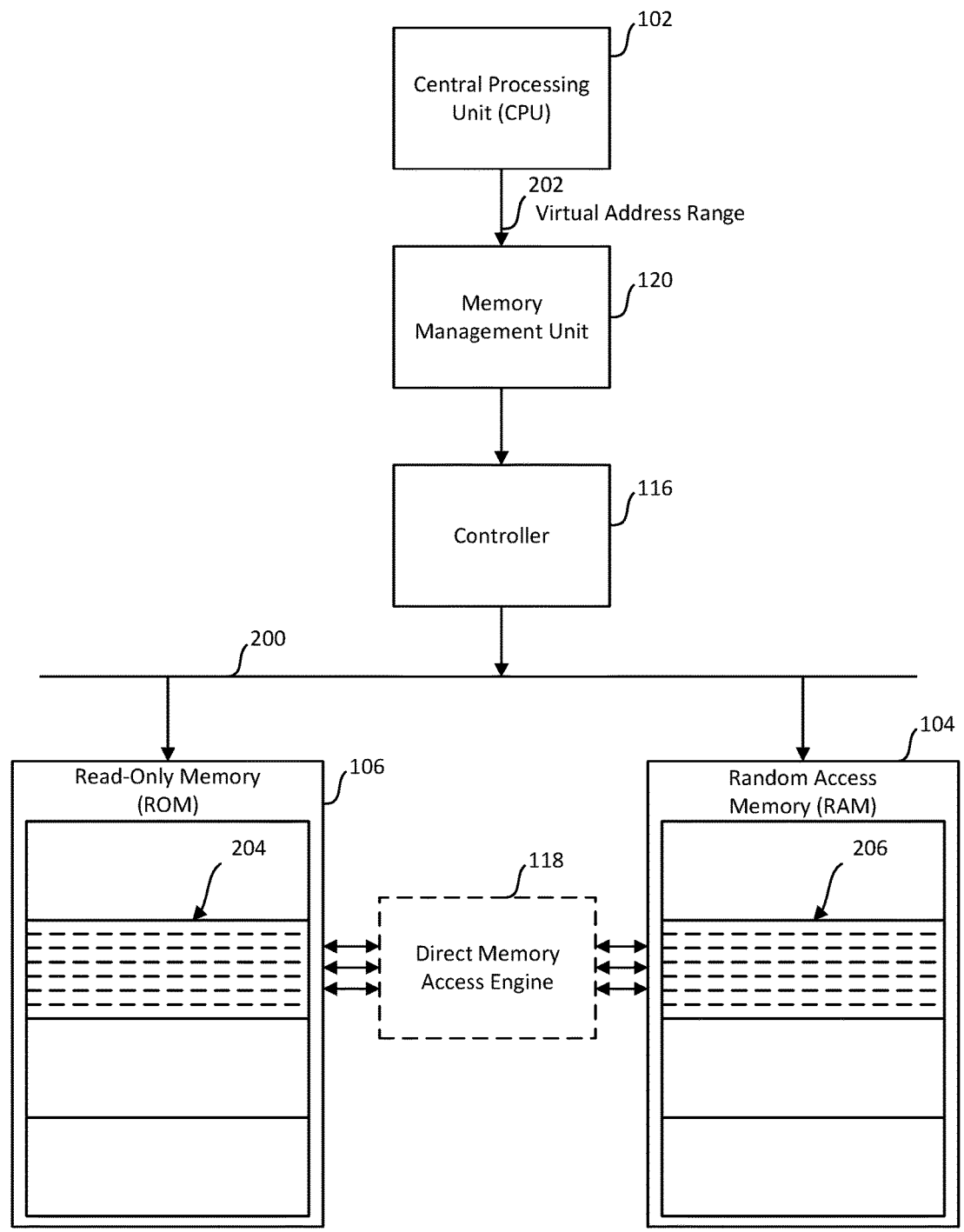
FIG. 2 is a block diagram of a set of software instructions transferred between a ROM and a RAM of the CPU architecture of FIG. 1, according to various examples described herein.

For illustration, FIG. 2 shows one example of a set of software instructions transferred between the ROM 106 and the RAM 104 of the CPU architecture 100 illustrated in FIG. 1. As illustrated, the CPU 102 generates an access request for a ROM resident set of software instructions corresponding to a ROM reference range of physical memory addresses (shown as range 204). The access request may refer a range of virtual addresses (shown as range of virtual addresses 202) to be translated by the CPU memory management unit 120 to the corresponding range of physical memory addresses 204. After the CPU memory management unit 120 translates the range of virtual memory addresses 202 to the range of physical memory addresses 204, the memory controller 116 is able to access the set of software instructions via a CPU bus 200.

The DMA engine 118 is controllable to incrementally read the set of software instructions from the ROM 106 and write the set of software instructions to the RAM 104, as discussed above. For instance, FIG. 2 illustrates the units corresponding to the range of physical memory addresses 204 transferred from the ROM 106 to the RAM 104. As each unit is transferred (e.g., each page or block), the DMA interrupt service routine 130 (not shown in FIG. 2) updates the CPU memory management unit 120 configuration to refer to the RAM reference range of physical memory addresses 206. As discussed, the DMA interrupt service routine 130 may update the CPU memory management unit 120 configuration dynamically during the transfer performed by the DMA engine 118.

While in certain examples, a CPU memory management unit, such as the CPU memory management unit 120 may translate between the range of virtual memory addresses and a range of physical memory addresses, in certain other examples, the memory controller 116 may instead map access requests to the ROM 106 or RAM 104. That is, in various examples, the memory controller 116 may map the range of virtual memory addresses to a first range of physical memory addresses of the ROM 106 while the set of software instructions are in the ROM 106, and may map the range of virtual memory addresses to a second range of physical memory address of the RAM 104 while the set of software instructions are in the RAM 104. In such an example, the DMA interrupt service routine 130 may dynamically update the memory controller 116 configuration as the set of software instructions are transferred.

Returning to FIG. 1, components of the CPU architecture 100 are coupled by one or more interconnection mechanisms (shown as lines between components). The interconnection mechanisms may include any communication coupling between system components such as one or more physical busses (e.g., a memory bus or a CPU bus) in conformance with specialized or standard computing bus technologies such as IDE, SCSI, PCI and InfiniBand. Unless otherwise specified the signal lines may be implemented as one of, or a combination of, discrete analog or digital signals lines. The interconnection mechanisms enable communications, including instructions and data, to be exchanged between system components of the CPU architecture 100. As shown, the interconnection mechanisms couple the CPU 102, the memory controller 116, the power controller 114, the one or more interface components 110, the RAM 104, the ROM 106, and the error detection module 112.

In certain examples, the memory controller 116 may act as a bridge to control other buses (not shown). For instance, the memory controller 116 may be coupled to a PCI bus for controlling other hardware devices, such as PCI based memory. Accordingly, in some examples the memory controller 116 may include both memory and bridge functionality. While in some examples described herein a CPU bus of the CPU architecture 100 is separate from the memory bus, in other implementations some portion of the memory bus may include a portion of the CPU. For instance, the RAM 104 may use the CPU bus while the ROM 106 does not (or vice versa).

As also illustrated in FIG. 1, in certain examples the CPU architecture 100 includes a power controller 114. While the power controller 114 is illustrated as an integrated circuit separate from the CPU 102, in various other examples the power controller 114 may be implemented as a software module or a hardware module within the CPU 102. The power controller is in electrical communication with at least the CPU 102 and the RAM 104, as shown in FIG. 1. However, in various other examples the power controller 114 may be in electrical communication with other components of the CPU architecture 100. The power controller 114 is coupled to an electrical power source 122 and configured to distribute electrical power to the CPU 102, RAM 104, and other components of the CPU architecture 100 that require electrical power to operate. For instance, the power controller 114 may be coupled to and configured to receive electrical power from a battery or an AC power supply.

In particular examples, the power controller 114 is configured to provide electrical power to activate the CPU 102 from an unpowered state, and remove the electrical power from the CPU 102 to deactivate the CPU 102 and place the CPU 102 in the unpowered state. The power controller 114 may further be configured to distribute power to the RAM 104 in synchronization with the CPU 102. For instance, the power controller 114 may apply power to the RAM 104 while the CPU 102 is in the powered state, and remove power from the RAM 104 when the CPU 102 is in the unpowered state. Control between the unpowered state and powered state (or vice versa) of the CPU 102 may correspond to the presence or absence of one or more faults or events, such as an operational or environmental condition sensed by an event detection system in communication with the CPU architecture 100. In response to receiving a signal indicative of an error or fault (e.g., sensor signal 124) at the interface component 110, the power controller 114 may remove power from the CPU 102 and RAM 104. Once the error or fault has been cleared (e.g., by the error or fault detection system) the power controller 114 may restore power to the CPU 102 and the RAM 104.

In various examples, the one or more system interface components 110 may include one or more interface devices, such as input devices, output devices, and combination input/output devices. Interface devices may receive input or provide output. More particularly, output devices may render information for external presentation. Input devices may accept information from external sources, such as a signal indicative of fault or error (shown as sensor data 124) that is provided by an error or fault detection system (not shown). While not illustrated in FIG. 1, in some examples the CPU architecture 100 may be incorporated within a system that includes an error or fault detection system, such as a sensor system for an autonomous vehicle or a guidance system. The error or fault detection system may include one or more sensors (e.g., power sensors, thermal sensors, impact sensors, radiation detectors, etc.) configured to sense an operational or environmental condition that requires a power down or reset of the system. In one particular example, the event detection system may be configured to detect an impact (e.g., a collision), or a radiation event (e.g., an increasing ionizing radiation level) in conjunction with a power fluctuation or program error such as a kernel panic. Other examples of other system interface devices allow the CPU architecture 100 to exchange information and to communicate with external entities, such as users and other systems.

As also illustrated in FIG. 1, in certain examples the CPU architecture 100 may include an error detection module 112. While the error detection module 112 may be implemented as a distributed collection of software and/or hardware modules and may integrated within the CPU 102 (as shown), in various other examples, the error detection module 112 is an integrated circuit separate from the CPU 102. The error detection module 112 is configured to detect and/or resolve one or more errors. For instance, the error detection module 112 may be a processor in a multi-processor implementation. In certain examples, the processor may detect that another processor of the multi-processor system is in an unresponsive condition. Other examples of detectable errors may include a hardware fault detect on a bus (e.g., PCI bus), an unrecoverable (e.g. double-bit error) memory fault, an operating system kernel panic, a stuck interrupt line, a denial of service attack that causes an overflow condition, or a hardware fault (e.g., overheating) that requires a power cycle.

The CPU architecture 100 may include an operating system that manages at least a portion of the hardware components included in the CPU architecture 100. In some examples, a CPU or controller, such as the CPU 102, executes the operating system. Examples of a particular operating system that may be executed include a Windows-based operating system, such as, Windows 10 operating systems, available from the Microsoft Corporation of Redmond, Wash., Android operating system available from Google of Mountainview, Calif., Blackberry operating system available from Blackberry Limited of Waterloo, Ontario, a MAC OS System X operating system available from Apple Incorporated of Cupertino, Calif., one of many Linux-based operating system distributions, for example, the Enterprise Linux operating system available from Red Hat, Inc. of Raleigh, N.C., or UNIX operating systems available from various sources. Many other operating systems may be used, and examples are not limited to any particular operating system. For instance, other operating system may include real-time and/or embedded operating systems and custom operating systems.

The CPU 102 and operating system together define a computer platform for which application programs in high-level programming languages may be written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, Ruby, Objective-C, Java, C++, C# (C-Sharp), Python, or JavaScript. Other object-oriented programming languages may also be used. Alternatively, functional, scripting, or logical programming languages may be used.

In various examples, the CPU architecture 100 is interconnected by, and may exchange data through, a communication network with other systems (e.g., other computer systems and other control systems). The network may include any communication network through which computer systems may exchange data. To exchange data using the network, the CPU architecture 100 may use various methods, protocols and standards to communicate information, including, among others, Fibre Channel, Ethernet, Wireless Ethernet, Bluetooth, IP, IPV6, TCP/IP, UDP, DTN, HTTP, FTP, SMS, MMS, SS7, JSON, SOAP, CORBA, REST, and Web Services. To ensure data transfer is secure, the CPU architecture 100 may transmit data via the network using a variety of security measures including, for example, SSL or VPN technologies.

Figure 3:
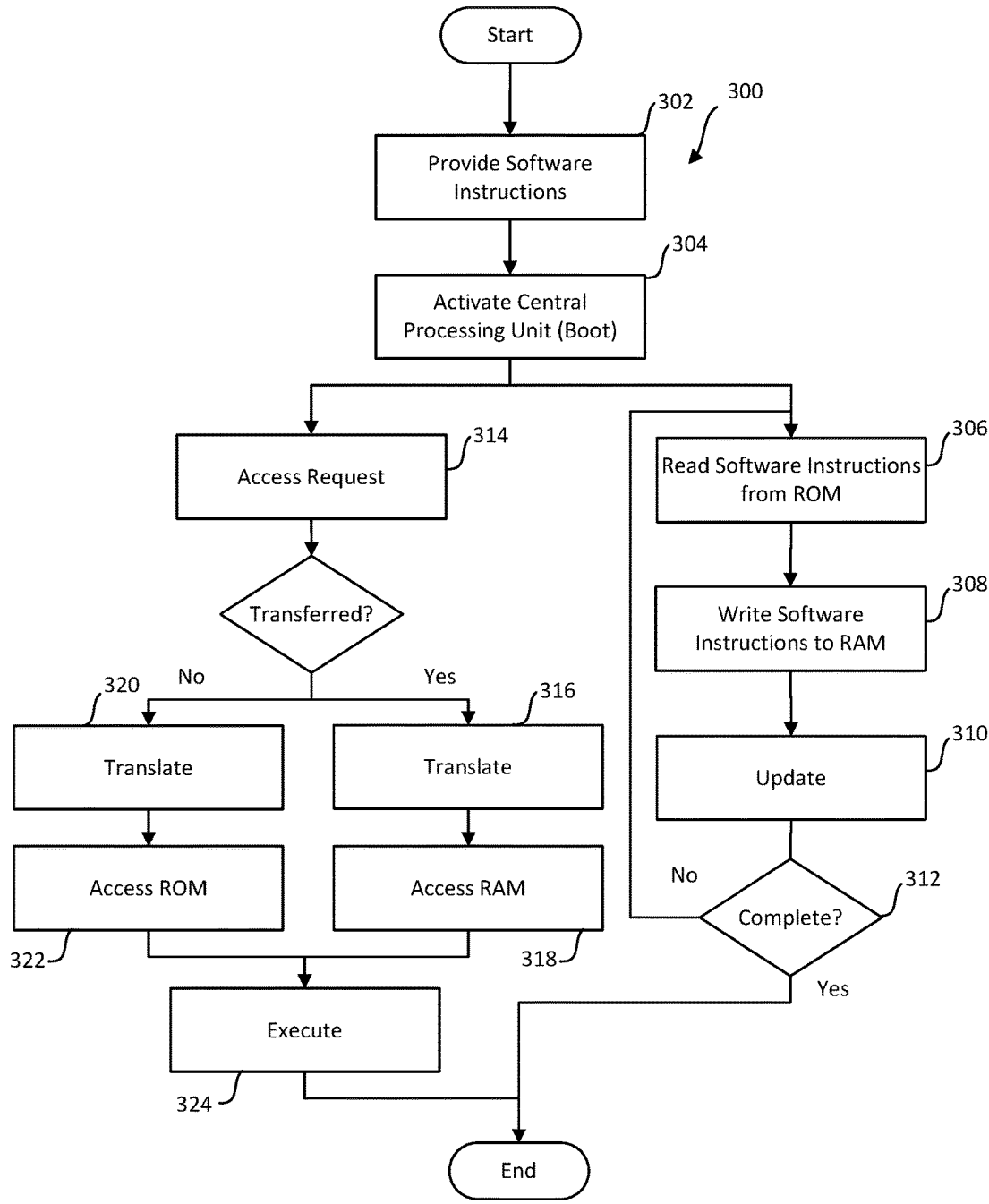
FIG. 3 is a process flow of a fast start-up method, according to various examples described herein.

Turning now to FIG. 3, illustrated is one example of a process flow for a fast start-up method 300 according to various examples described herein. Various acts and steps of the method 300 described with reference to FIG. 3 may be performed by the example CPU architecture 100 illustrated in FIG. 1, and the components thereof. Accordingly, FIG. 3 is described with continuing reference to FIG. 1. In various examples, the method 300 may include the acts of providing a set of software instructions stored at the ROM 106 (e.g., ROM resident software instructions), activating the CPU 102, reading the set of software instructions from the ROM 106, writing the set of software instructions to the RAM 104, updating a range of physical memory addresses for the set of software instructions to point to the RAM 104, receiving an access request for the set of software instructions, translating a range of virtual memory addresses to the range of physical memory address, and executing the set of software instructions. While described with reference to FIG. 3 as a set of software instructions, it is appreciated that in various other examples the set of software instructions may instead be data and/or a combination of software instructions and data. In one particular example, the set of software instructions is a ROM resident system image. Accordingly, the set of software instructions is merely exemplary and used for the convenience of description.

In act 302, the method 300 includes providing a set of software instructions available at the ROM 106. As such, in various examples the set of software instructions is ROM resident permitting a fast start-up. In various examples, providing the set of software instructions at the ROM includes storing the set of software instructions such that they are made available in one or more memory frames that correspond to one or more pages or one or more blocks of virtual memory. The set of software instructions are addressable by a range of physical memory addresses and may be executed by the CPU 102 responsive to one or more access requests. In particular, the one or more access requests may reference a range of virtual memory addresses that are translatable to the range of physical memory addresses.

In act 304, the method 300 includes activating the CPU 102 from an unpowered state. In various examples, activating the CPU 102 includes applying power to the CPU 102 with the power controller 114. As discussed herein, during the unpowered state, the CPU 102 is provided no electrical power and is completely dormant. Accordingly, unlike traditional sleep modes, during the unpowered state the CPU 102 does not have access to electrical power and is therefore unable to sustain the contents of volatile memory (i.e., the contents of RAM 104 are lost). In particular examples, providing power with the power controller 114 may include deriving power from an electrical power source, such as a battery or an AC power source, and routing power to the CPU 102.

In acts 306 and 308 the method 300 includes incrementally transferring the set of software instructions from the ROM 106 to a RAM 104 with the DMA engine 118. For instance, the DMA engine 118 may be controlled to transfer the set of software instructions. In various examples, acts 306 and 308 include incrementally reading the set of software instructions from the ROM 106 and writing the set of software instructions to the RAM 104 with the DMA engine 118. While in one example, acts 306 and 308 include transferring the set of software instructions from the ROM 106 to the RAM 104 one page or block at a time, in various other examples, the set of software instructions may be transferred from the ROM 106 to the RAM 104 using other sizes. In one example, the size of a transferred unit is adjustable.

In act 310, the method 300 includes updating the CPU memory management unit 120 configuration to translate the range of virtual memory addresses to an updated range of physical memory addresses of the RAM 104, while the DMA engine 118 transfers the next set of software instructions to the RAM 104. For instance, as each page or block of the set of software instructions is transferred from the ROM 106 to the RAM 104, the DMA interrupt service routine 130 may update the range of physical memory addresses of the transferred page or block to refer to the new location in RAM 104. Accordingly, the method 300 includes incrementally migrating the access requests of the CPU 102 from the ROM 106 to the RAM 104, via updates to the range of physical memory addresses, as the set of software instructions are transferred by the DMA engine 118 from the ROM 106 the RAM 104. In such an example, the range of virtual memory addresses remains unchanged as their corresponding physical address changes from ROM 106 to RAM 104. Acts 306-310 may be repeated for each page or block of the set of software instructions until a complete copy of the set of software instructions is available at the RAM 104 (act 312).

In act 314, the method 300 includes receiving one or more access requests for the series of software instructions. If the series of instructions have not been transferred to the RAM 106, the method 300 then includes translating the range of virtual memory addresses to a range of physical memory addresses corresponding to the ROM 106 (act 320). Once translated, the method 300 includes accessing the set of software instructions with the memory controller 116, and executing the set of software instructions (acts 322 and 324). However, if the series of instructions have been transferred to the RAM 104, the method 300 includes translating the range of virtual memory addresses (mapped in act 320 to the ROM 106 original range) to a range of physical memory addresses corresponding to the RAM 104 copy (act 316). As discussed above, this range of physical memory addresses includes the range of physical memory addresses updated by the DMA interrupt service routine 130. Once translated, the method 300 includes accessing the set of software instructions with the memory controller 116, and executing the set of software instructions (acts 318 and 324).

Figure 4:
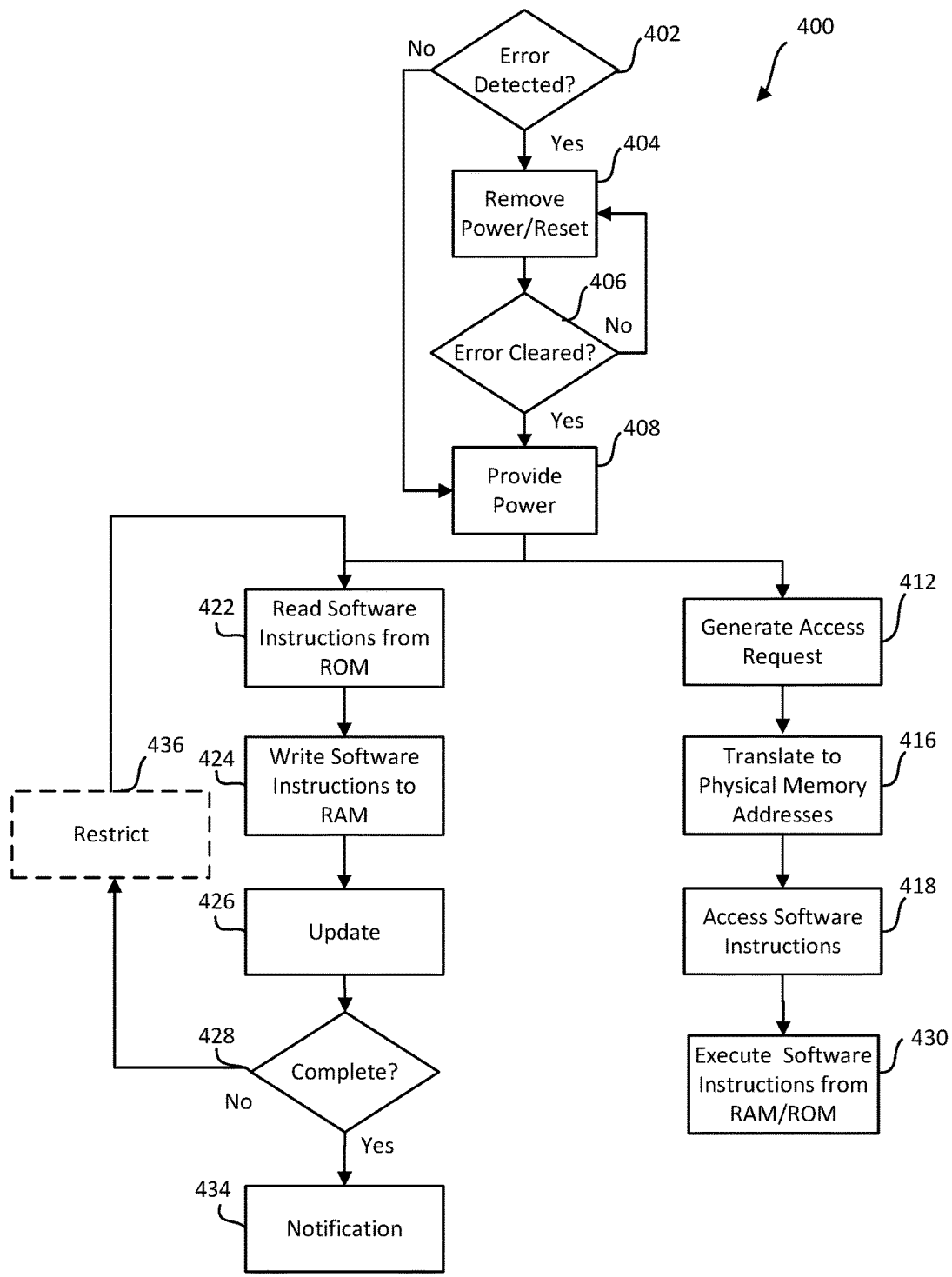
FIG. 4 a detailed process flow of a fast start-up method, according to various examples described herein.

While not explicitly illustrated in FIG. 3, the method 300 may include various other acts and sub-processes. FIG. 4 illustrates a more detailed process flow of a fast start-up method 400. Various acts and steps of the method 400 described with reference to FIG. 4 may be performed by the example CPU architecture 100 illustrated in FIG. 1, and the components thereof. Accordingly, FIG. 4 is described with continuing reference to FIG. 1. However, FIG. 4 is merely illustrative, and in various other examples the acts and steps of FIG. 4 may be implemented by a CPU architecture for a different type of computing system.

In act 402, the method 400 includes determining if an error or fault has occurred or is about to occur. In various examples, act 402 may include receiving a signal indicative of an error or fault from an error or fault detection system via the interface component 110 of the CPU architecture 100. For instance, the signal indicative of the event may be an analog or digital signal provided by an error or fault detection system. While in one example, the error or fault may be an operational or environmental fault, in various other examples, the signal indicative of the error or fault may be indicative of some other type of error or fault. Signals from the error or fault detection system may be received in real-time during the operation of the CPU architecture 100.

If the CPU architecture 100 has not received a signal indicative of an error or fault, the method 400 proceeds to act 408 during which a power signal is provided to the components of the CPU architecture 100, such as the CPU 102, RAM 104, and memory controller 116. However, if a signal indicative of an error or fault has been received, the method 400 includes the act of removing the power signal from the RAM 104, the CPU 102, and other components (act 404). As discussed above with reference to at least FIG. 1, in various examples the power controller 114 is configured to remove the power signal from the CPU 102, RAM 104, and other components of the CPU architecture 100 to place those components in an unpowered and protected state. In particular, act 404 may include opening one or more switches or relays, or activating a power by-pass path, to remove the power signal from the described components of the CPU architecture 100. While described in one example with reference to act 404 as a power cycle (e.g., removal and reapplication of power), in certain other examples, act 404 may include one or more acts of a reset process. In such an example, software instructions and/or data is still available in the RAM 104 but corrupted or otherwise not trustworthy. Accordingly, one or more reset processes may be performed to restore a state of the CPU architecture 100.

Once the CPU 102, RAM 104, and other components have been placed in the unpowered or reset state, the method 400 may include determining if the error or fault has been cleared (act 406). For instance, the CPU architecture 100 may listen for a signal from the error or fault detection system that indicates that the error or fault has ended or detected parameters have returned to a safe level. Acts of determining if an error or fault has ended may include comparing detected parameters (e.g., sensor levels) to one or more thresholds. Upon receipt of a signal indicating that the error or fault has been cleared, the method 400 proceeds to act 408, during which power is restored to the components of the CPU architecture 100 to return those components to the powered state. As further discussed herein, application of power to components of the CPU architecture 100 may initiate the start-up procedure.

In various examples, the method 400 includes accessing a set of software instructions for the CPU 102 using one or more access requests. While described with reference to FIG. 4 as a set of software instructions, it is appreciated that in various other examples the set of software instructions may instead be data and/or a combination of software instructions and data. In one particular example, the set of software instructions is a ROM resident system image. Accordingly, the set of software instructions is merely exemplary and used for the convenience of description.

The one or more access requests include a range (or ranges) of virtual memory addresses that may be translated to a range (or ranges) of physical memory addresses corresponding to a location of the set of software instructions on or in the ROM 106 or RAM 104. While described herein as "virtual" addresses, it is appreciated that "virtual address" may also be referred to by other terms, such as "effective address", "bus address", or other address that is used to select or refer to memory. Accordingly, in act 412, the method 400 may include generating one or more access requests for the set of software instructions. The access requests may be provided by the CPU 102 to the memory controller 116. Each access request may reference a particular range of virtual memory addresses. That range of virtual memory addresses is translated to the corresponding range of physical memory address by the CPU memory management unit 120. As such, in various examples, act 416 may include translating the range of virtual memory addresses to the range of physical memory address with the CPU memory management unit 120. As described herein, in certain examples the set of software instructions is stored as one or more pages or one or more blocks of virtual memory and the CPU architecture 100 maintains a page table or a block table that may be referenced to translate between the range of virtual memory addresses and the range of physical memory addresses. While in one example, the page table or the block table may be stored in main memory (e.g., the RAM 104), in various other examples the CPU memory management unit 120 or the memory controller 126 may maintain a local page table (e.g., internal to CPU 102) to permit fast access to page table entries or block table entries.

In such an example, a virtual memory addresses may include a portion corresponding to a page number, and a physical memory addresses may include a portion corresponding to a frame number. Each page table entry is indexed by page number and contains the frame number corresponding to that page number. Accordingly, in various examples, the method 400 includes providing one or more page table entries to translate between the range of virtual memory addresses and the range of physical memory addresses. In other examples, a virtual memory address may include a portion corresponding to a block number, and a physical memory addresses may include a portion corresponding to a frame number. Each block table entry is indexed by block number and contains the frame number corresponding to that block number. Accordingly, in various examples, the method 400 includes providing one or more block table entries to translate between the range of virtual memory addresses and the range of physical memory addresses. In act 418, the method 400 includes accessing the set of software instructions based on the range of physical addresses.

As also described above with reference to FIGS. 1 and 2, in various examples the DMA engine 118 may be controlled to incrementally transfer the set of software instructions from the ROM 106 to the RAM 104. In act 422, the method 400 includes reading the set of software instructions from the ROM 106, and in act 424, the method 400 includes writing the set of software instructions to the RAM 104. In various examples, the software instructions may be arranged and transferred in a plurality of pages or blocks. For example, the software instructions may be split into a plurality of portions that each correspond to a size of a page within virtual memory or a block with virtual memory. Each page or block may be transferred one at a time from the ROM 106 to the RAM 104.

In act 426, the method 400 includes updating the CPU memory management unit 120 configuration to translate the range of virtual memory addresses to an updated range of physical memory address, while the DMA engine 118 is controlled to transfer the set of software instructions to the RAM 104. In particular, as each page or block of the set of software instructions is transferred from the ROM 106 to the RAM 104, the DMA interrupt service routine 130 updates the physical memory address of the transferred page or block to refer to the new location of the page or block in the RAM 104. For instance, act 426 may include updating one or more page table entries or block table entries (e.g., the frame number of a page table entry or a block table entry) within a page table or block table of main memory (e.g., RAM 104) or a local page table or local block table (e.g., in local cache) of the CPU memory management unit 120. In an example where the memory controller 116 performs the described mapping operations, act 426 may include updating the memory controller 116 configuration instead of, or in addition to, the CPU memory management unit 120 configuration.

Accordingly, the method 400 includes incrementally migrating the access requests of the CPU 102 from the ROM 106 to the RAM 104, via updates to the range of physical memory addresses of the accessed set of software instructions, as the set of software instructions are transferred from the ROM 106 to the RAM 104. In act 428, the method 400 includes determining if the entire set of software instructions has been transferred to the RAM 104. In various examples, if the complete set of software instructions has not been transferred to the RAM 104, the method 400 may include restricting access to the physical memory addresses (at the RAM 104) of the transferred pages or blocks of the set of software instructions (act 436). For example, the method 400 may include providing a default page table entry or block table entry from the local page table or local block table while the set of software instructions are being transferred. Once the transfer is complete, access to the page table or block table in main memory may be permitted.

However, in various other examples, the CPU 102 may execute each unit of the set of software instructions from the RAM 104 as soon as they become available in the RAM 104, and execute the remaining units of the software instructions from the ROM 106 until they become available in the RAM 104. In this manner, a portion of the set of software instructions may remain at the ROM 106 (waiting to be transferred to the RAM 104) while the CPU 102 executes the remaining portion of the set of software instructions from the RAM 104.

If the entire set of software instructions has been transferred to the RAM 104, the method 400 proceeds to act 434, during which the DMA engine 118 generates a notification that the complete set of software instructions is available in the RAM 104. In act 430, the method 400 includes executing the complete set of software instructions from the RAM 104, in response to receiving the notification at the CPU 102. If the entire set of software instructions has not been transferred to the RAM 104, the method 400 returns to act 422 and includes transferring the set of software instructions until the complete set has been relocated, as described above with reference to acts 422-428.

Figure 6:
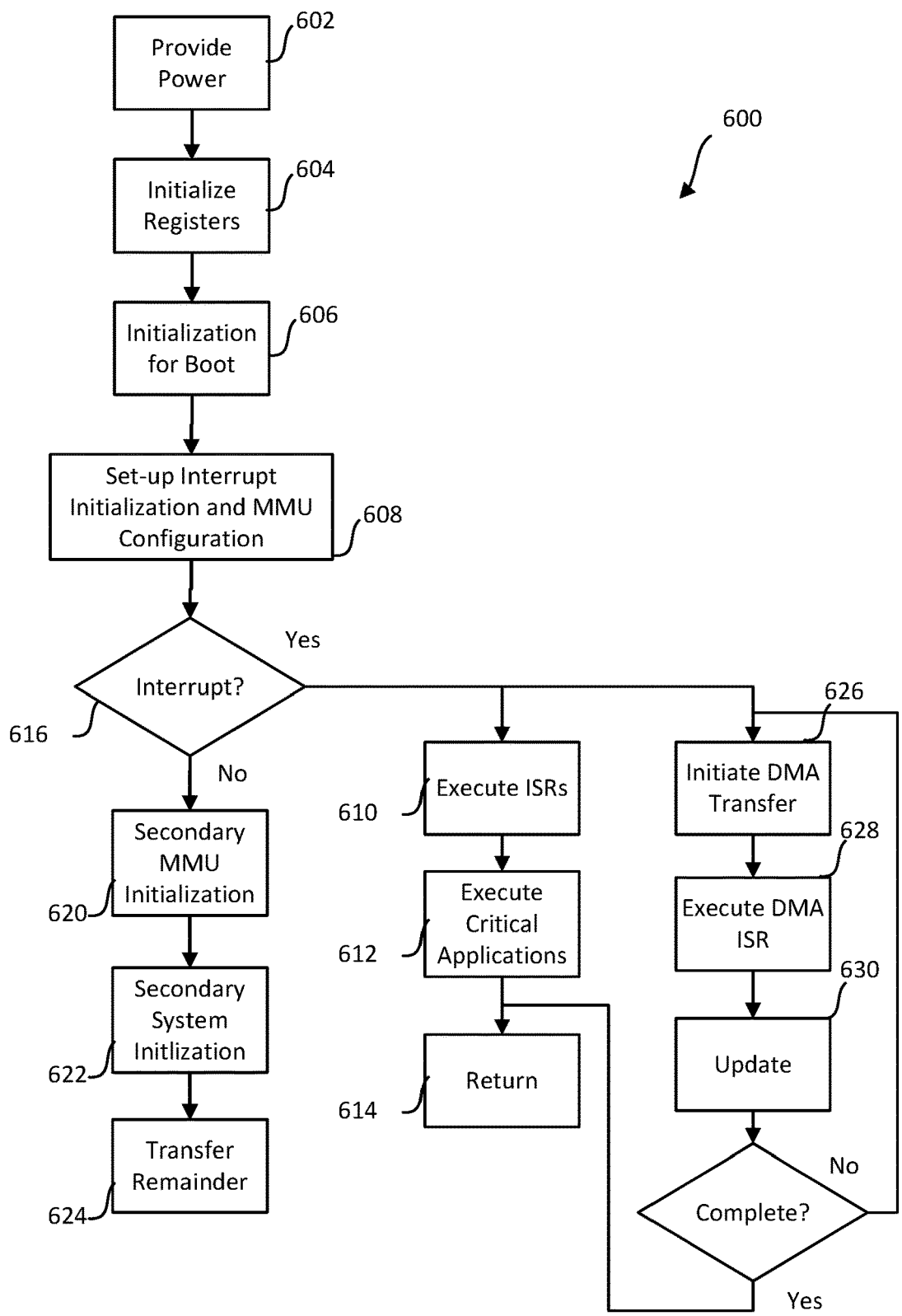
FIG. 6 is another detailed process flow of a fast start-up method, according to various examples described herein.

As discussed with reference to FIG. 4, while not explicitly illustrated in FIG. 3, the method 300 may include various other acts and sub-processes. FIG. 6 illustrates another more detailed process flow of a fast start-up method 600. Various acts and steps of the method 600 described with reference to FIG. 6 may be performed by the example CPU architecture 100 illustrated in FIG. 1, and the components thereof. Accordingly, FIG. 6 is described with continuing reference to FIG. 1.

In acts 602 and 604 the method 600 includes providing power (e.g., power-on) to deactivated components of the CPU architecture 100, such as the CPU 102 and the RAM 104, and executing instructions from a boot vector memory address. In various examples, the boot vector is a default location that the CPU 102 references to execute a set of start-up (boot) instructions. Following the application of electrical power to the CPU 102 and the RAM 104, the method 600 includes the act of initializing the CPU 102 registers and the memory controller registers that permit or configure access to the RAM 104 (act 604). In act 606, the method 600 includes performing initialization operations for the boot instructions, such as copying data variables to the RAM 104, and establishing the stacks for boot and critical interrupt service routines (ISR) in the RAM 104. In some examples the initialization operations for the boot software instructions may include application specific critical interrupt service routines (ISR)s.

In act 608, the method 600 includes setting-up the interrupt processing initialization, the DMA interrupt service routine 130, and setting-up an initial configuration for the CPU memory management unit 120 (e.g., a page table or a block table). Following act 608, one or more interrupts may be possible (decision block 616). While illustrated as immediate following act 608 for the purpose of illustration, it is appreciated that one or more interrupts may be received at any point following act 608.

If an interrupt is received, the method 600 includes suspending the boot operations while the interrupt vectors execute the corresponding interrupt service routines. As discussed herein, each interrupt vector refers to an entry within an interrupt vector table that associates an interrupt handler with an interrupt request. Each interrupt request indicates a high priority condition that demands immediate attention by the CPU 102. In response an interrupt request, the CPU executes the corresponding interrupt handler. For example, in act 610 the method 600 includes executing an interrupt service routine (ISR) (i.e., interrupt handler), and in act 614 the method 600 includes executing the critical applications corresponding to the interrupt service routine. The critical applications are executed with the CPU 102 using the data variables and the stacks available in the RAM 104. The time it takes to service critical ISR applications is important to time critical applications and, accordingly, ROM resident boot configurations may be used to support this fast response. While in one example, the method 600 includes executing typical interrupt service routines (act 610), and executing the corresponding critical applications (act 612), in various other examples, the method 600 includes initiating a DMA engine transfer between the ROM 106 and the RAM 106, as discussed herein (act 626).

In act 626, a set of software instructions are transferred by the DMA engine 118 from the ROM 106 to the RAM 104. According to various examples, the DMA engine 118 supports requests to transfer large regions of ROM 106 to RAM 104. In such an example, act 626 includes transferring a region of the ROM 106 (e.g., a set of software instructions) as a plurality of smaller transfers to support update of memory address translations with finer granularity. For example a two megabyte transfer may partitioned into multiple four kilobyte portions to correspond to a size of a page of virtual memory. In some examples, the DMA interrupt service routine 130 partitions and schedules the plurality of transfers required for the large region request, in addition to updating the CPU memory management unit 120 configuration. In various examples the size of the transfers may be selectable and adjustable to accommodate system design parameters.

Following act 626, the method 600 includes executing the DMA interrupt service routine 130 (act 628), and updating the CPU memory management unit 120 configuration to change the ROM 106 reference range of physical memory addresses to a RAM 104 reference range of physical memory addresses. While in some examples the DMA interrupt service routine 130 updates a configuration of the CPU memory management unit 120 by updating a local page table or local block table, in various other examples, the DMA interrupt service routine 130 may update the memory controller 116 configuration (e.g., decode module 126), a page table or block table in the RAM 104 or ROM 106, or any combination thereof (act 630). While described herein as performed by the DMA interrupt service routine 130, in various other examples updates may be performed by a hardware component and/or a combination of a software component and a hardware component. The DMA interrupt service routine 130 may coordinate with the memory controller 116 to update the CPU memory management unit 120 automatically without CPU 102 intervention. It is appreciated that while the memory controller 116 may be able to update the memory management information that it has access to, some memory management information may be inaccessible by the memory controller 116. Specifically, the memory controller 116 may update configuration information stored in RAM 104, and invalidate configuration information in CPU 102, such as the page tables, but may not have access to modify some memory management unit information if located only within CPU 102.

In various examples, the memory controller 116 may delegate page table or block table management. For instance, in some examples, the memory controller 116 manages the local page tables or local block tables of the CPU memory management unit 120, and provides CPU 102 page table requests or block table requests with default table entries, rather than actual memory contents until the page tables or block tables are setup in RAM 104. In such an example, default table entries pointing to the ROM 106 are provided until the set of software instructions are available in RAM 104. Once the set of instructions are available in RAM 104, actual page table entries or block table entries are created in the respective page table or block table in the RAM 104. Following act 630, the CPU 102 continues to execute the set of software instructions from the same as-built memory address range, however that address range is now translated to point to the RAM 104 rather than the ROM 106 (act 614). At this point, the set of software instructions pulled from memory are pulled at the speed of RAM 104 rather than at the speed of the ROM 106.

As discussed herein, in various examples, the set of software instructions may be transferred from the ROM 106 to the RAM 104 in a plurality of back-to-back transfers referred to herein as "bursts". In various examples, cache lines of the CPU 102 correspond to the burst transfer size such that each burst transfer fills a cache line. When the CPU 102 reads instructions and/or data for the first time, it is loaded into the cache if the CPU memory management unit 120 indicates that the memory is cacheable. For each subsequent read of the instructions and/or data, the CPU 102 will read the instructions and/or data from the cache, if it is available. In certain examples, writes that hit cache are additionally either transferred to the CPU bus if the CPU memory management unit 120 indicates the memory is write-through cacheable, or the cache line is marked as dirty (modified). If a cache line is dirty, it is transferred back to memory when either the CPU explicitly flushes the cache line, or when a subsequent cache line is needed and none are available. Cache line flushes result in burst write transfers.

In some examples described herein, the CPU memory management unit 120 utilizes an initial configuration of write-through caching to monitor CPU 102 write access to the ROM 106. Some examples support changing a state of CPU memory management unit 120 page table entry or block table entry cache status from a write-through to a write-back configuration after a physical memory address range is updated by the DMA interrupt service routine 130 (e.g., in act 630). Certain examples support selection of the option to update cache access type.

In certain examples, the method 600 may include monitoring write accesses during the transfer operations performed by the DMA engine 118 to ensure the RAM 104 contains the latest transferred unit. In certain examples, the method 600 includes mirroring cache access to ROM 106 in RAM 104 by writing the read burst to RAM 104 as it is read from the ROM 106. In particular, the method 600 may include using cache burst reads and write-through writes to transfer data from the ROM 106 to the RAM 105 opportunistically, in addition to the DMA engine 118 transfer. In such an example, the method 600 is similar to a level two cache in which cache line holes are filled via the DMA engine 118 to become a RAM 104 copy of a portion or all of ROM 104. Such an example may include utilizing either a dedicated memory controller 116 memory, or a portion of the ROM 106 or RAM 104 to maintain a table of page identifiers and dirty bits for each cache line. The local page table or local block table may be consulted by memory controller 116 while transfer operations are performed to ensure the fresh data is not overwritten by the corresponding stale ROM 106 version.

In act 620, the method 600 includes the act of performing secondary memory management unit 120 initialization. In various examples, act 620 may include setting up page tables or block tables for the CPU memory management unit 120 in the RAM 104. In act 622, the method 600 includes the act of performing a secondary system initialization for other components of the CPU architecture 100, such as a local bus (e.g., PCI). Following act 622, the method 600 includes copying remaining data from the ROM 106 to the RAM 104 and transitioning to an operating system and/or system applications.

Accordingly, various aspects and examples described herein are directed fast start-up and recovery methods, and a CPU architecture for start-up and recovery. In various examples, the CPU architecture may be integrated within various computing systems, such as embedded control systems for autonomous vehicles, inertial measurement, aerospace, and other guidance systems, telecommunication systems, medical equipment, and financial transaction systems, to name a few examples. In addition to the described CPU architecture, the examples of the computing systems, such as the control system for an autonomous vehicle, may include various other system components such as crash detection sensors, power sensors, and etc. The control system for the autonomous vehicle may monitor these sensors and other system components to detect an error of fault condition.

Accordingly, in addition to providing greater system stability for systems that rely on processing power, various examples of the CPU architecture and related processes described herein fundamentally improve the functionality of the CPU itself. That is, various aspects and examples improve the speed and executional efficiency of the CPU by improving the response time and boot-up time of the CPU.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A central processing unit architecture comprising:
read-only memory storing a set of software instructions addressable by a first range of physical memory addresses and executable by a central processing unit via one or more access requests, the one or more access requests including a range of virtual memory addresses corresponding to the first range of physical memory addresses;
random access memory;
a direct memory access engine, the direct memory access engine controllable to transfer the set of software instructions from the read-only memory to the random access memory, the set of software instructions addressable by a second range of physical memory addresses corresponding to the range of virtual memory addresses at the random access memory;
a central processing unit memory management unit configured to translate the range of virtual memory addresses to the first range of physical memory addresses while the set of software instructions is in the read-only memory, and to translate the range of virtual memory addresses to the second range of physical memory addresses while the set of software instructions is in the random access memory; and
the central processing unit configured, responsive to the direct memory access engine transferring the set of software instructions to the random access memory, to execute a direct memory access interrupt service routine to update the central processing unit memory management unit to translate the range of virtual memory addresses to the second range of physical memory addresses.

2. The central processing unit architecture of claim 1, wherein the set of software instructions is a read-only memory resident system image.

3. The central processing unit architecture of claim 1, wherein the set of software instructions is stored in at least one page of virtual memory.

4. The central processing unit architecture of claim 3, wherein the central processing unit memory management unit is configured to maintain a local page table including one or more page table entries that translate the range of virtual memory addresses for the at least one page.

5. The central processing unit architecture of claim 1, wherein the central processing unit memory management unit is configured to provide at least a first page table entry of the local page table to the central processing unit to translate the range of virtual memory addresses to the first range of physical memory addresses, and wherein the central processing unit memory management unit is configured to transfer a second page table entry of the local page table to the random access memory, the second table entry being accessible at the random access memory to translate the range virtual memory addresses to the second range of physical memory addresses.

6. The central processing unit architecture of claim 5, wherein the central processing unit memory management unit is configured to restrict access to the first page table entry while the set of software instructions is in the random access memory.

7. The central processing unit architecture of claim 1, wherein the set of software instructions is stored in at least one block of virtual memory.

8. The central processing unit architecture of claim 7, wherein the central processing unit memory management unit is configured to maintain a local block table including one or more block table entries that translate the range of virtual memory addresses for the at least one block.

9. The central processing unit architecture of claim 1, wherein the direct memory access engine is further configured to generate a notification once the set of software instructions is in the random access memory.

10. The central processing unit architecture of claim 1, wherein the central processing unit is configured to execute the set of software instructions in response to activation of the central processing unit from an unpowered state, and the central processing unit architecture further comprises a power controller configured to distribute power to at least the central processing unit, wherein the power controller is configured to provide power to activate the central processing unit from the unpowered state.

11. The central processing unit architecture of claim 1, wherein the set of software instructions is stored in a plurality of pages or a plurality of blocks of virtual memory, and wherein the direct memory access engine is configured to transfer the set of software instructions from the read-only memory to the random access memory one page of the plurality of pages, or one block of the plurality of blocks, at a time.

12. The central processing unit architecture of claim 11, wherein in executing the direct memory access interrupt service routine, the direct memory access interrupt service routine is configured to update the central processing unit memory management unit to translate the range of virtual memory addresses to the second range of physical memory addresses as each page of the plurality of pages, or each block of the plurality of blocks, is transferred.

13. The central processing unit architecture of claim 1, wherein the read-only memory is magnetoresistive random-access memory (MRAM) and the random access memory is static random access memory (SRAM).

14. A method for operating a central processing unit, the method comprising:
at read-only memory, providing a set of software instructions addressable by a first range of physical memory addresses, the set of software instructions executable by a central processing unit via one or more access requests, the one or more access requests including a range of virtual memory addresses corresponding to the first range of physical memory addresses;
at a central processing unit memory management unit, translating the range of virtual memory addresses to the first range of physical memory addresses while the set of software instructions is in the read-only memory;
transferring the set of software instructions from the read-only memory to a random access memory with a direct memory access engine, the set of software instructions addressable by a second range of physical memory addresses corresponding to the range of virtual memory addresses while in the random access memory;
via a direct memory access interrupt service routine executed in response to the direct memory access engine transferring the set of software instructions to the random access memory, updating the central processing unit memory management unit to translate the range of virtual memory addresses to the second range of physical memory addresses; and at a central processing unit memory management unit, translating the range of virtual memory addresses to the second range of physical memory addresses once the set of software instructions is in the random access memory.

15. The method of claim 14, further comprising at a memory controller, first accessing the set of software instructions at the read-only memory based on the first range of physical memory addresses, and subsequently accessing the set of software instructions at the random access memory based on the second range of physical memory addresses, once the set of software instructions is transferred to the random access memory.

16. The method of claim 15, wherein providing the set of software instructions at the read-only memory includes storing the set of software instructions in a memory frame corresponding to at least one page of virtual memory, the method further comprising, at the central processing unit memory management unit, maintaining a local page table including one or more page table entries that translate the range of virtual memory addresses.

17. The method of claim 16, wherein translating the range of virtual memory addresses to the first range of physical memory addresses includes providing at least a first table entry of the local page table to the central processing unit, and wherein translating the range of virtual memory addresses to the second range of physical memory addresses includes transferring a second table entry of the local page table to the random access memory, the second table entry being accessible at the random access memory by the memory controller.

18. The method of claim 17, further comprising restricting access to the first table entry while the set of software instructions is in the random access memory.

19. The method of claim 14, wherein providing the set of software instructions at the read-only memory includes storing the set of software instructions in a memory frame corresponding to at least one block of virtual memory, the method further comprising, at the central processing unit memory management unit, maintaining a local block table including one or more block table entries that translate the range of virtual memory addresses.

20. The method of claim 14, wherein providing the set of software instructions includes storing the set of software instructions in a plurality of pages or in a plurality of blocks of virtual memory corresponding to one or more memory frames in the read-only memory,
wherein transferring the set of software instructions from the read-only memory to the random access memory includes transferring the set of software instructions one page of the plurality of pages, or one block of the plurality of blocks, at a time, and
wherein updating the central processing unit memory management unit includes updating the central processing unit memory management unit to translate the range of virtual memory addresses to the second range of physical memory addresses as each page of the plurality of pages, or each block of the plurality of blocks, is transferred.

* * * * *